United States Patent

Ruile et al.

[11] Patent Number: 6,084,503
[45] Date of Patent: Jul. 4, 2000

[54] RADIO-INTERROGATED SURFACE-WAVE TECHNOLOGY SENSOR

[75] Inventors: Werner Ruile; Gerd Scholl, both of Munich; Thomas Ostertag, Fimsing; Leonhard Reindl, Stephanskirchen; Valentin Magori, Munich, all of Germany

[73] Assignee: Siemens Aktiengesellschaft, Munich, Germany

[21] Appl. No.: 08/945,294

[22] PCT Filed: Mar. 18, 1996

[86] PCT No.: PCT/DE96/00471

§ 371 Date: Oct. 17, 1997

§ 102(e) Date: Oct. 17, 1997

[87] PCT Pub. No.: WO96/33423

PCT Pub. Date: Oct. 24, 1996

[30] Foreign Application Priority Data

Apr. 18, 1995 [DE] Germany ............... 195 14 343

[51] Int. Cl.[7] .................................................. H04Q 5/22
[52] U.S. Cl. ............... 340/10.1; 340/870.3; 340/870.16; 340/572.1; 340/10.4; 324/96; 324/117 R; 324/117 H; 324/127; 324/239; 324/252; 310/313 R; 310/313 B
[58] Field of Search ............... 340/825.54, 870.3, 340/870.16, 664, 572.1; 324/96, 117 R, 117 H, 127, 239, 252; 310/313 R, 313 B

[56] References Cited

U.S. PATENT DOCUMENTS

| 3,273,146 | 9/1966 | Hurwitz, Jr. . |
| 4,620,191 | 10/1986 | Skeie ................... 310/313 B |
| 4,725,841 | 2/1988 | Nysen et al. . |
| 5,289,160 | 2/1994 | Fiorletta . |
| 5,691,698 | 11/1997 | Scholl et al. ............ 340/572.1 |
| 5,966,008 | 10/1999 | Maier et al. .............. 324/96 |

FOREIGN PATENT DOCUMENTS

| 0 166 065 | 2/1986 | European Pat. Off. . |
| 0 465 029 A 2 | 8/1992 | European Pat. Off. . |
| 43 36 504 | 2/1995 | Germany . |
| WO 93/00252 | 7/1993 | WIPO . |
| WO 93/13495 | 8/1993 | WIPO . |

OTHER PUBLICATIONS

Electronic Letters, vol. 23, No. 9, Apr. 23, 1987, Surface–Acoustic–Wave Device Incorporating Conducting Langmuir–Blodgett Films, pp. 446–447.

Proceedings of the IEEE, vol. 64, No. 5, May 1976, Surface–Acoustic–Wave Pressure and Temperature Sensors, Thomas M. Reeder et al, pp. 754–756.

Primary Examiner—Brian Zimmerman
Assistant Examiner—Yves Dalencourt
Attorney, Agent, or Firm—Hill & Simpson

[57] ABSTRACT

Radio-interrogated surface-wave technology sensor, in which the sensitive element (12) is an impedance which is electrically connected as termination to a surface-wave structure (26) of the sensor.

2 Claims, 3 Drawing Sheets

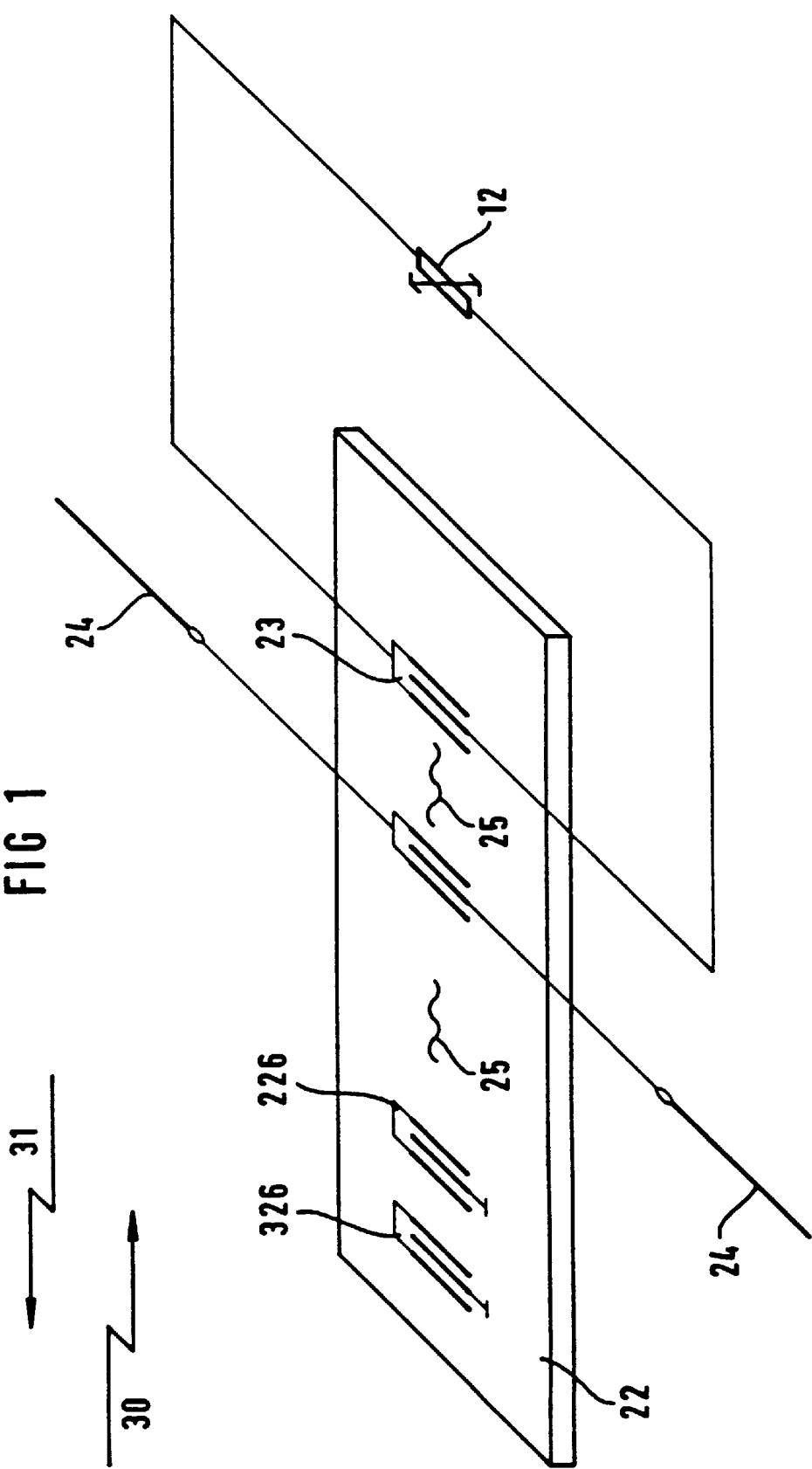

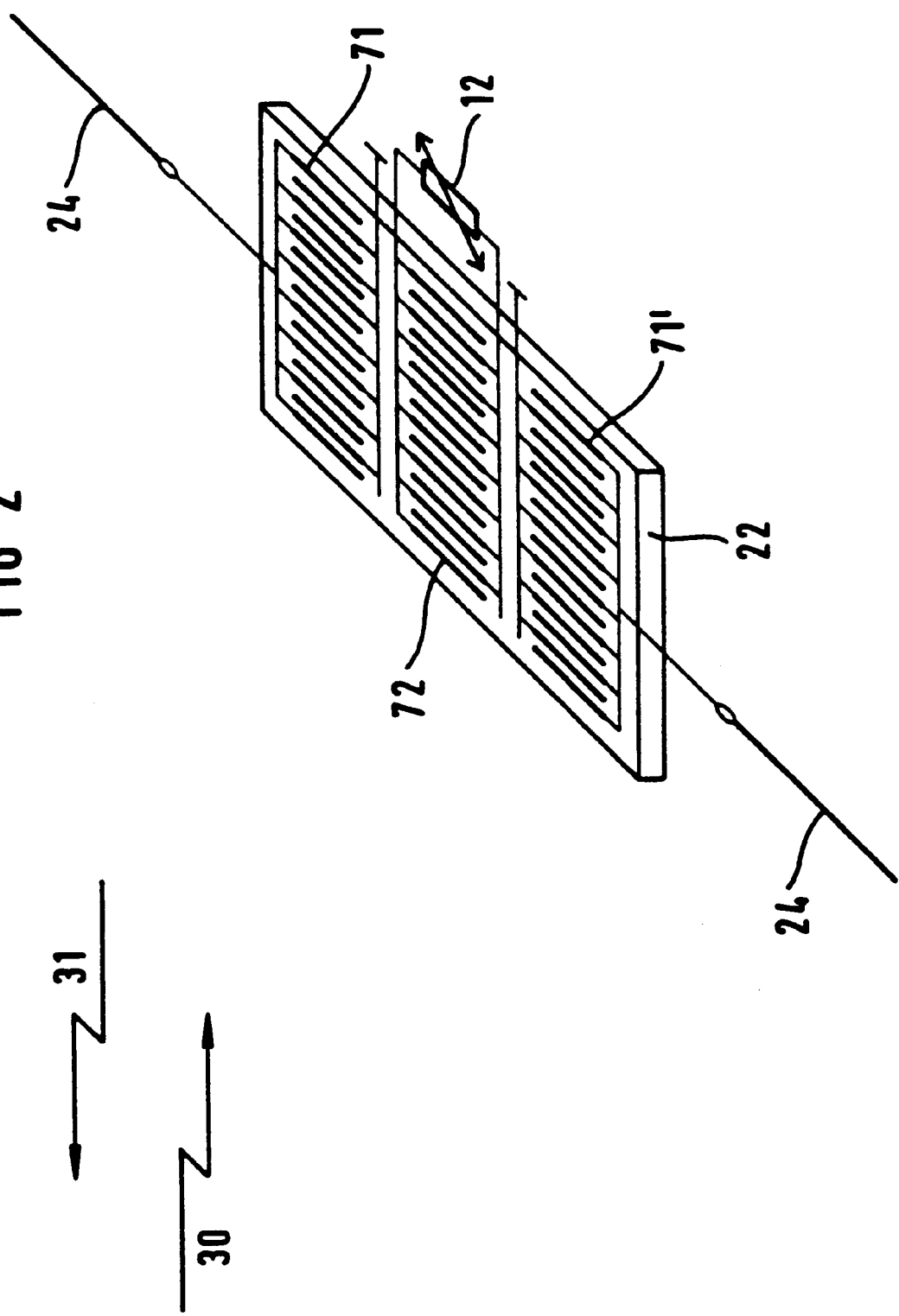

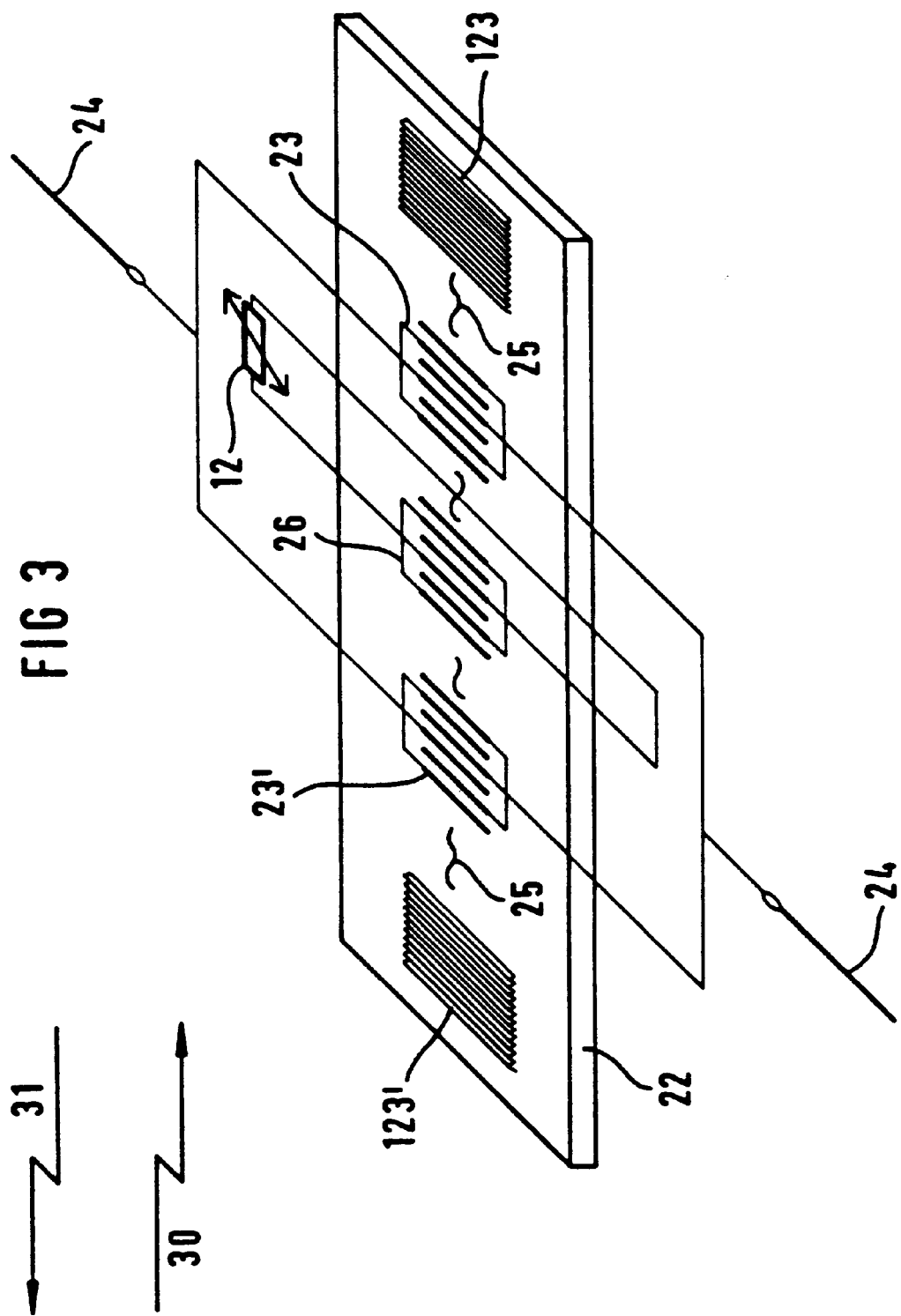

6,084,503

RADIO-INTERROGATED SURFACE-WAVE TECHNOLOGY SENSOR

BACKGROUND OF THE INVENTION

The invention relates to a radio-interrogated passive sensor.

Surface-wave arrangements relevant to the invention in connection with sensors are known from International Reference WO 93/13495, International Reference WO/CH93/00252, U.S. Pat. No. 3,273,146, U.S. Pat. No. 4,725,841, U.S. Pat. No. 4,620,191.

The cited publications describe methods of building and operating various surface-wave arrangements, which all have the common factor that, by means of an interdigital transducer, surface waves are produced in a piezoelectric substrate body from an electrical signal, and these surface waves as a rule propagate essentially perpendicularly to the interdigital alignment of the transducer electrodes at the surface of the substrate body. With a second interdigital transducer, which may even be the transducer already described above with double mode operation, it is possible to recover a characteristically altered radiofrequency signal from the surface wave. As described in the prior art, such a surface-wave arrangement may comprise yet further structures such as reflector structures, further transducer structures, etc. which, for example, may also have dispersive arrangement of the reflector/transducer fingers, encoded arrangement of the fingers, and the like.

An important aspect and subject of the present invention is a radio-interrogated surface-wave technology sensor which is passive, that is to say requires no (DC) power supply, and to which a radiofrequency signal, for example a burst pulse, an FM-CW signal, a chirped pulse or the like, is transmitted from a remote radiofrequency transmitter. The surface-wave arrangement of the sensor part, that is to say its input transducer structure is for this purpose equipped with an antenna for radio reception of this transmitted pulse. A corresponding antenna, which is connected to a second transducer structure of the surface-wave arrangement, or, in the case already mentioned of a transducer structure with double-mode operation, is the same antenna, is used to transmit back the impulse-response signal of the surface-wave arrangement, which is to be received in a remote receiver. The impulse-response signal transmitted back is as a rule different than the signal received by the surface-wave arrangement, namely according to the current-strength measurement to be determined, and this is actually because of corresponding physical action on the surface-wave arrangement.

Radio-interrogated surface-wave arrangements are already used, for example, in toll systems on roads, in inroad tunnels or the like, but in this case the detection of preprogrammed individual encoding of the impulse-response signal for object identification is involved. Radio-interrogated surface-wave arrangements have also been used in metrology, these arrangements being as a rule constructed as delay lines, and measures being taken for the purpose of measurement such that the measured quantity to be determined in the surface-wave arrangement causes a change in the propagation time in the acoustic wave. This change in propagation time may be based on an electric field (oriented transversely to the propagation direction of the surface wave) in the substrate body, this field producing, for example by piezoelectric effect, a change in propagation time in the corresponding partial region of the substrate body (European Reference 0166065). By way of example, a temperature sensor using the change in the wave propagation time is known (European Reference 0465029). An arrangement which exploits an impedance change of an organic layer applied to the surface of the substrate body of the surface-wave arrangement is suitable for measuring surface loading of this layer, for example with a chemical substance to be identified/quantitatively measured (Electronics Letters, Vol. 23 (1987) No. 9 pp. 446/447). A relevant pressure meter is also known, in which the mechanical property of the body, for example flexion, altered as a function of the pressure in the material of the substrate body of the surface-wave arrangement, causes a change in the propagation time of the acoustic wave and renders it usable for determining the measured value (Proceedings IEEE, Vol. 64, (1976) pp. 754–6). However, in the case of the arrangements last mentioned here, a remote interrogation by radio is not provided.

SUMMARY OF THE INVENTION

An object of the present invention is to provide a new configuration for a radio-interrogated, remote-interrogated sensor device with surface waves.

Such an object is achieved with an arrangement which has:

a surface-wave arrangement with surface-wave structures and (at least) one antenna, (at least) one sensitive impedance element as sensor part, a radiofrequency transmitter and receiver having transmission and reception antennas and an electronic evaluation device, the impedance element, which is to be exposed to the effect to be detected by the sensor part, being electrically connected to a surface-wave structure, and the transmitter serving for radio transmission of an interrogation pulse and the receiver, with its evaluation device, serving for radio reception and for qualitative/quantitative evaluation of the change, influenced by the effect, in the impulse response of the surface-wave arrangement.

The impedance element may be a reactance element (for example a magnetic field-dependent element) which is electrically connected to at least one of the surface-wave structures of the surface-wave arrangement. The impedance element must be suitable for changing its electric impedance behavior as a function of the effect to be detected with the sensor. In general terms, the present invention is a sensor arrangement having a surface-wave arrangement with surface-wave structures and an antenna. A sensitive impedance element is a sensor part. A radio frequency transmitter and receiver is provided. The receiver has a radio antenna and electronic evaluation device. The impedance element, which is to be exposed to the effect to be detected by the sensor part, is electrically connected to at least one of the surface-wave structures. The transmitter is designed for radio transmission of an interrogation pulse and the receiver with its evaluation device is designed for radio reception and for qualitative/quantitative evaluation of the change, influenced by the effect on the impedance element, in the impulse response of the surface-wave arrangement.

Advantageous developments of the present invention are as follows.

The sensitive element is a resistive element.

The resistive element is a magnetoresistor.

The resistive element is a photoresistor.

The sensitive element is a variable-capacitance diode.

The sensitive element is a coil to be arranged in a magnetic field.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 1, 2 and 3 show embodiments of the surface-wave arrangement for a sensor according to the invention, in each case with connected impedance element.

DESCRIPTION OF THE PREFERRED EMBODIMENTS

In the examples represented in FIGS. 1 to 3, the respective surface-wave arrangement 21 has a configuration which, although simple, makes it possible to explain the essence of the mechanism of a surface-wave arrangement used in the invention. 22 denotes the piezo-electric body, known per se, of the surface-wave arrangement 21. On one surface of this body 22, an interdigital transducer structure 23 is arranged in known fashion. 24 denotes the antenna, consisting of two dipole halves. Other relevant antenna structures such as, for example, a patch antenna, loop antenna or the like may, however, also be provided. A radiofrequency interrogation signal 30 is received by this antenna 24 and the radiofrequency electric voltage produced between the two dipole halves supplies the two interdigital finger structures of the transducer 23. The surface wave 25 produced with the transducer 23 as input transducer propagates on/in the surface of the substrate body 22. Such a wave is schematically indicated by 25. As it propagates, it also enters the active region of the structure 26, which acts as a reflector for the wave 25 because of its fingers. Since the structure 26 is (likewise) designed as an interdigital finger structure and, as can be seen from the figures, the impedance element 12 is electrically connected to its two interdigital structures, a radiofrequency electric voltage, for which the element 12 acts as an electrical terminating impedance, is additionally produced in the structure 26 by virtue of the acoustic surface wave. Since the electrical impedance of the element 12 changes as a function of the amplitude of the effect, this causes a change in the (complex) electrical terminating impedance of the structure 26. An influence is produced, which lies differently (in the extreme case) between very high terminating impedance and substantially short-circuit terminating impedance, this being as a function of the amplitude. By suitably selected dimensioning of the electrical values of the element 12, a favorable measurement range of the terminating impedance due to the element 12 can be set in each case. The impulse-response signal is denoted 31.

In other words, the element 12 thus acts as an electrical terminating impedance, which constitutes the novel feature of the invention.

In the known P-matrix representation of a transducer, the reflection of this transducer can be expressed as follows as a function of its electrical termination impedance:

$$P_{11}(Y_{Load}) = P_{11}(SC) + 2 \cdot \frac{P_{13}^2}{(P_{33} + Y_{Load})}$$

in which $P_{11}$ (SC) is the short-circuit reflection factor, $P_{13}$ is the electroacoustic conversion, $P_{33}$ is the transducer admittance and $Y_{Load}$ is the terminating admittance.

It is expedient (in each case) to provide a narrow-band antenna in order to protect the device against various electromagnetic inferences.

FIG. 1 shows a special surface-wave arrangement having a substrate wafer 22 and surface-wave structures present thereon. 23 denotes the input/output transducer, to which the dipole halves of the antenna 24 for radio reception and radio re-transmission are connected. The transducer 26 which is connected to the impedance element 12 and serves as surface-wave reflector is arranged on the wafer 22, on one side of the transducer 23.

On the other side of the surface of the wafer 22, in FIG. 1, for example two reference reflectors 226 and 326 are provided, these serving, in addition to measuring the effect through the sensor element 12, also to determine the distance between the transmitter/receiver and the sensor element 12 of the sensor and also the temperature of the sensor element. For example, the distance between the surface-wave component and its part which is built as a transmit/receive station may vary continuously. The basis for the distance measurement and the temperature measurement is in this case that the actual sensor element 12 is likewise located on the wafer or is positioned at a small defined distance therefrom. In the determination of the distance (changes) and the temperature of the sensor element, it is possible, for example, to eliminate possible known transverse sensitivities of the sensor signal in the signal processing.

Further regions of surface-wave arrangements which are suitable for the invention are shown in FIGS. 2 and 3. FIG. 2 shows an arrangement with mode-coupled transducers. The transducers, denoted 71 and 71', on the substrate wafer 2 are input/output transducers with their dipole halves of the antenna 24. The transducer 72 is likewise a surface-wave structure which is mode-coupled to the transducers 71, 71'. This mode-coupled transducer 72 is connected to the impedance element 12 and the change in its terminating impedance, that is to say the change of the element 12 in the magnetic field, is the measured quantity to be evaluated, as in the above-described examples.

FIG. 3 shows a surface-wave resonator arrangement. This comprises, on the substrate 22, the input/output transducers 23, 23' and the transducer 26 which is connected as before to the impedance element. 123 and 123' denote reflector structures at which the acoustic wave propagating in the substrate surface is reflected back on itself, so that these reflectors have the effect of mirrors of a resonator.

The effect of the sensor element 12 on the response of the surface-wave structure is expressed as, or can be measured as, a change in the impulse-response signal in terms of the amplitude and/or phase thereof relative to the interrogation signal.

A sensor according to the invention is gauged/calibrated in a manner known per se, as employed in many cases for gauging sensors/measuring instruments which output quantitative measurements.

The surface-wave arrangement can also be integrated with the impedance-related sensor 12 in hybrid fashion as an additional surface-wave chip. The sensor 12 may, for example, be a resistive element arranged on a large-scale support substrate, to which a piezoelectric layer, for example of zinc oxide, is furthermore also applied as substrate layer 22 for the surface-wave arrangement. The sensor element may, for example, be a semiconductor component on/in a silicon substrate.

Suitable impedances (12) include resistive as well as capacitive and inductive impedances, alone or in combination. These may, for example, be photoresistors, magnetoresistors, temperature-sensitive resistors, carbon microphones and the like and/or variable-capacitance diodes, capacitive position/displacement sensors, moisture sensors and inductive elements, for example a coil, a displacement pick-up/position transducer and the like.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be inter-pretend as illustrative and not in a limiting sense.

What is claimed is:

1. A sensor arrangement, comprising:

a surface-wave arrangement having surface-wave structures and an antenna;

a sensitive impedance element as a sensor part, said sensitive element being a resistive element, the resistive element being a photoresistor;

a radio frequency transmitter and receiver with radio antenna and electronic evaluation device;

the impedance element, which is exposable to an effect to be detected by the sensor part, being electrically connected to at least one of the surface-wave structures; and the transmitter being structured for radio transmission of an interrogation pulse and the receiver with its evaluation device being structured for radio reception and for qualitative/quantitative evaluation of a change, influenced by the effect on the impedance element, in the impulse response of the surface-wave arrangement.

2. A sensor arrangement, comprising:

a surface-wave arrangement having surface-wave structures and an antenna;

a sensitive impedance element as a sensor part, the sensitive element being a variable-capacitance diode;

a radio frequency transmitter and receiver with radio antenna and electronic evaluation device;

the impedance element, which is exposable to an effect to be detected by the sensor part, being electrically connected to at least one of the surface-wave structures; and the transmitter being structured for radio transmission of an interrogation pulse and the receiver with its evaluation device being structured for radio reception and for qualitative/quantitative evaluation of a change, influenced by the effect on the impedance element, in the impulse response of the surface-wave arrangement.

* * * * *